United States Patent
Berthet et al.

(10) Patent No.: US 9,271,444 B2
(45) Date of Patent: Mar. 1, 2016

(54) FRUIT HARVESTING UNIT

(75) Inventors: Jean-Paul Berthet, La Chaize-Giraud (FR); Bruno Montaigu, La Guérinière (FR)

(73) Assignee: CNH France S.A. (FR)

( * ) Notice: Subject to any disclaimer, the term of this patent is extended or adjusted under 35 U.S.C. 154(b) by 191 days.

(21) Appl. No.: 14/001,001

(22) PCT Filed: Feb. 22, 2012

(86) PCT No.: PCT/EP2012/053035
§ 371 (c)(1),
(2), (4) Date: Jan. 9, 2014

(87) PCT Pub. No.: WO2012/113845
PCT Pub. Date: Aug. 30, 2012

(65) Prior Publication Data
US 2014/0109541 A1    Apr. 24, 2014

(30) Foreign Application Priority Data
Feb. 22, 2011  (FR) .................................. 11 00539

(51) Int. Cl.
| | |
|---|---|
| *A01D 46/00* | (2006.01) |
| *A01D 46/26* | (2006.01) |
| *A01D 46/28* | (2006.01) |
| *A01D 46/06* | (2006.01) |

(52) U.S. Cl.
CPC .............. *A01D 46/26* (2013.01); *A01D 46/06* (2013.01); *A01D 46/28* (2013.01)

(58) Field of Classification Search
CPC . A01D 46/28; A01D 2046/266; A01D 46/26; A01D 46/00; A01D 46/264; A01D 46/285; A01G 17/02; A01G 17/026; Y10S 56/19

USPC ....................... 56/330, 328.1, 340.1
See application file for complete search history.

(56) References Cited

U.S. PATENT DOCUMENTS

| | | | | |
|---|---|---|---|---|
| 3,613,343 A | * | 10/1971 | Sagouspe et al. ............... | 56/330 |
| 3,703,072 A | * | 11/1972 | Patzlaff .......................... | 56/330 |
| 3,727,388 A | * | 4/1973 | Smith ............................. | 56/330 |
| 3,822,537 A | * | 7/1974 | Sell ................................ | 56/330 |
| 4,014,160 A | * | 3/1977 | Mecca ................... | A01D 46/28 56/330 |
| 4,022,001 A | * | 5/1977 | Burton ........................... | 56/330 |
| 4,063,406 A | * | 12/1977 | Burton ........................... | 56/330 |
| 4,085,572 A | * | 4/1978 | Bruel ............................. | 56/330 |
| 4,236,371 A | * | 12/1980 | Claxton .......................... | 56/330 |
| 4,321,786 A | * | 3/1982 | Burton ........................... | 56/330 |
| 4,418,521 A | * | 12/1983 | Orlando ................ | A01D 46/28 56/330 |
| 4,750,322 A | * | 6/1988 | Korthuis ............... | A01D 46/28 56/328.1 |
| 4,769,979 A | | 9/1988 | Merant | |
| 4,771,594 A | * | 9/1988 | Deux et al. ..................... | 56/330 |

(Continued)

*Primary Examiner* — Árpád Fábián-Kovács
(74) *Attorney, Agent, or Firm* — Patrick M. Sheldrake

(57) ABSTRACT

A fruit harvesting unit mounted on a harvesting machine. The harvesting unit comprises a straddling chassis delimiting a harvesting tunnel in which plants to be shaken are introduced successively to move through said tunnel between a front opening and a rear opening of said tunnel. The harvesting unit has a main shaker system including two shaker devices disposed on respective sides of the harvesting tunnel to delimit transversely a central part of said tunnel, and an additional shaker system that is mounted on the straddling chassis and comprises two shaker devices disposed on respective sides of the harvesting tunnel to delimit transversely a front upper part of said tunnel.

8 Claims, 3 Drawing Sheets

(56) References Cited

U.S. PATENT DOCUMENTS

| | | | |
|---|---|---|---|
| 4,860,529 A * | 8/1989 | Peterson et al. | 56/330 |
| 4,924,666 A * | 5/1990 | Poncet | A01D 46/28 |
| | | | 56/330 |
| 4,959,950 A * | 10/1990 | Burke | 56/340.1 |
| 5,067,314 A * | 11/1991 | Burke | 56/330 |
| 5,074,107 A | 12/1991 | Windemuller | |
| 5,291,726 A * | 3/1994 | Nairn | 56/330 |
| 5,495,708 A * | 3/1996 | Scott et al. | 56/329 |
| 5,642,610 A * | 7/1997 | Dupon et al. | 56/340.1 |
| 5,765,350 A * | 6/1998 | Ochse | 56/328.1 |
| 6,502,380 B1 * | 1/2003 | Merant et al. | 56/330 |
| 6,634,162 B1 * | 10/2003 | Andros | A01G 17/02 |
| | | | 56/328.1 |
| 7,500,342 B2 * | 3/2009 | Merant et al. | 56/330 |
| 8,069,641 B2 * | 12/2011 | Pellenc et al. | 56/328.1 |
| 8,511,051 B2 * | 8/2013 | Pellenc et al. | 56/330 |
| 2004/0050030 A1 * | 3/2004 | Merant | 56/340.1 |
| 2010/0139234 A1 | 6/2010 | Pellenc et al. | |

\* cited by examiner

FRUIT HARVESTING UNIT

This application is the US National Stage filing of International Application Serial No. PCT/EP2012/053035 filed on Feb. 22, 2012 which claims priority to French Application 11 00539 filed Feb. 22, 2011, each of which is incorporated herein by reference in its entirety.

FIELD OF THE INVENTION

The invention concerns a unit for harvesting fruit intended to be mounted on a harvesting machine and a fruit harvesting machine including a support structure on which are mounted a harvesting unit of this kind and a system for recovering the detached harvest.

The invention is applied in particular to the mechanised harvesting of fruit growing on trees or bushes planted in rows, such as grapes, berries, coffee beans, olives, etc. and notably fruit growing in bunches.

BACKGROUND OF THE INVENTION

Fruit is conventionally harvested by a harvesting unit straddling at least one row of plants and mounted on the support structure of a harvesting machine that is moved along said row. To this end, the harvesting unit includes a straddling chassis delimiting a harvesting tunnel into which the plants are successively introduced to move through said tunnel between respective openings at the front and at the rear of said tunnel.

To detach the harvest from the plants the harvesting unit includes a shaker system including two shaker devices, said shaker devices being arranged on respective sides of the harvesting tunnel to delimit said tunnel transversely.

The harvesting machine further includes a recovery system for conveying the flow of harvest obtained enabling, possibly after cleaning and/or sorting, storage thereof in at least one hopper provided for this purpose or in an ancillary trailer.

However, for some plant varieties, in particular olive trees, standard harvesting units have as straddling chassis, the vaulted top of which is lower than said plants.

Because of this, on introduction of a plant into the harvesting tunnel, the top of said plant abuts against the vault of the straddling chassis with the result that the plant is bent over in said tunnel, which limits the efficacy of the shaking of said plant, in particular in relation to the harvesting of fruit at the top.

To overcome this problem, some manufacturers of harvesting machines have proposed to increase the height of the standard harvesting units to adapt said units to the height of olive trees.

However, the shaker devices of a harvesting unit increased in height in this way have a large size that compromises the efficacy of harvesting. Moreover, this increased height leads to a problem with the stability of the machine during harvesting.

To overcome these problems, document EP 2 196 080 proposes a harvesting unit including a lower front shaker system and an upper rear shaker system. The harvesting unit is adapted so that the plant is shaken in a bent state by the lower front system after which the top is shaken by the upper rear system with the plant straightened up.

This solution proves difficult to implement, however, and is not fully satisfactory for the harvesting of fruit located at the top of the plants.

The invention aims in particular to solve the problems referred to above by proposing a fruit harvesting unit that enables satisfactory harvesting of fruit present over the entire height of the plants without necessitating any modification of the structure of the straddling chassis of said unit.

SUMMARY OF THE INVENTION

To this end, a first aspect of the invention proposes a fruit harvesting unit adapted to be mounted on a harvesting machine, said unit including a straddling chassis delimiting a harvesting tunnel into which plants to be shaken are introduced successively to move through said tunnel between a front opening and a rear opening of said tunnel, said harvesting unit having a main shaker system including two shaker devices disposed on respective sides of the harvesting tunnel, transversely delimiting a central part of said tunnel, said harvesting unit further including an additional shaker system that is mounted on the straddling chassis, said additional shaker system including two shaker devices disposed on respective sides of the harvesting tunnel to delimit transversely a front upper part of said tunnel.

A second aspect of the invention proposes a fruit harvesting machine including a support structure on which are mounted a harvesting unit of the above kind and a system for recovering the detached harvest.

BRIEF DESCRIPTION OF THE DRAWINGS

Other objects and advantages of the invention will become apparent in the course of the following description, which is given with reference to the appended figures, in which.

DETAILED DESCRIPTION OF PREFERRED EMBODIMENTS

In the context of this description, position in space terms are defined relative to the travel direction of the machine. In particular, with reference to FIG. 2a, the terms "front" and "rear" are represented at the top and at the bottom of this figure, respectively, "left" and "right" are represented respectively on the right and on the left in this figure, "transverse" means between "left" and "right", and "longitudinal" means between "front" and "rear".

The invention concerns a fruit harvesting machine intended in particular for mechanised harvesting of fruit growing on trees or bushes planted in rows, such as grapes, berries, coffee beans, olives, etc. and in particular fruit growing in bunches. The harvesting machine is more particularly intended for harvesting olives.

The harvesting machine includes a support structure, notably a motorised structure, on which a harvesting unit may be mounted permanently or removably so as to be replaceable by other equipment and accessories, for example spraying equipment, pruning equipment or equipment for working the soil.

The harvesting machine also includes a system for recovering the harvest detached by the harvesting unit, said system being mounted on the support structure of said harvesting machine. In one embodiment, the recovery system includes two bucket conveyors adapted to recover the detached harvest underneath the harvesting unit and to convey said harvest into the upper part of the harvesting machine.

The harvesting machine may further include a system for cleaning and/or sorting the flow of harvest fed by the bucket conveyors to eliminate components other than fruit, in particular leaves, leaf stalks and wood particles.

The harvesting unit includes a straddling chassis that may be mounted on the support structure in fixed manner or to swing in a pendulum fashion about a horizontal longitudinal axis, said straddling chassis delimiting a harvesting tunnel into which the plants to be shaken are successively introduced to move through said tunnel between a front opening and a rear opening of said tunnel.

Figure 1:
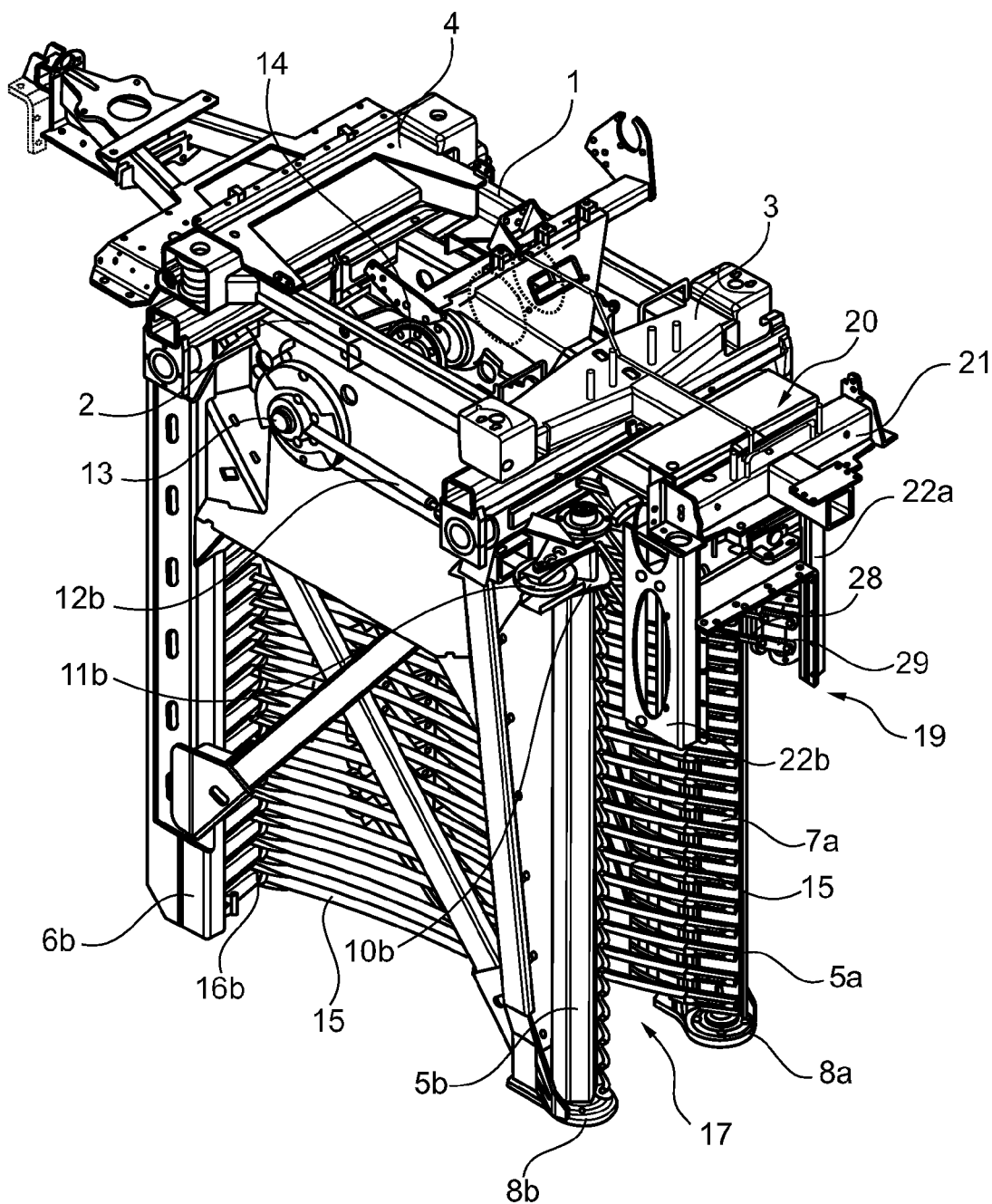
FIG. 1 shows diagrammatically and in perspective a harvesting unit of one embodiment of the invention.
Figure 2:
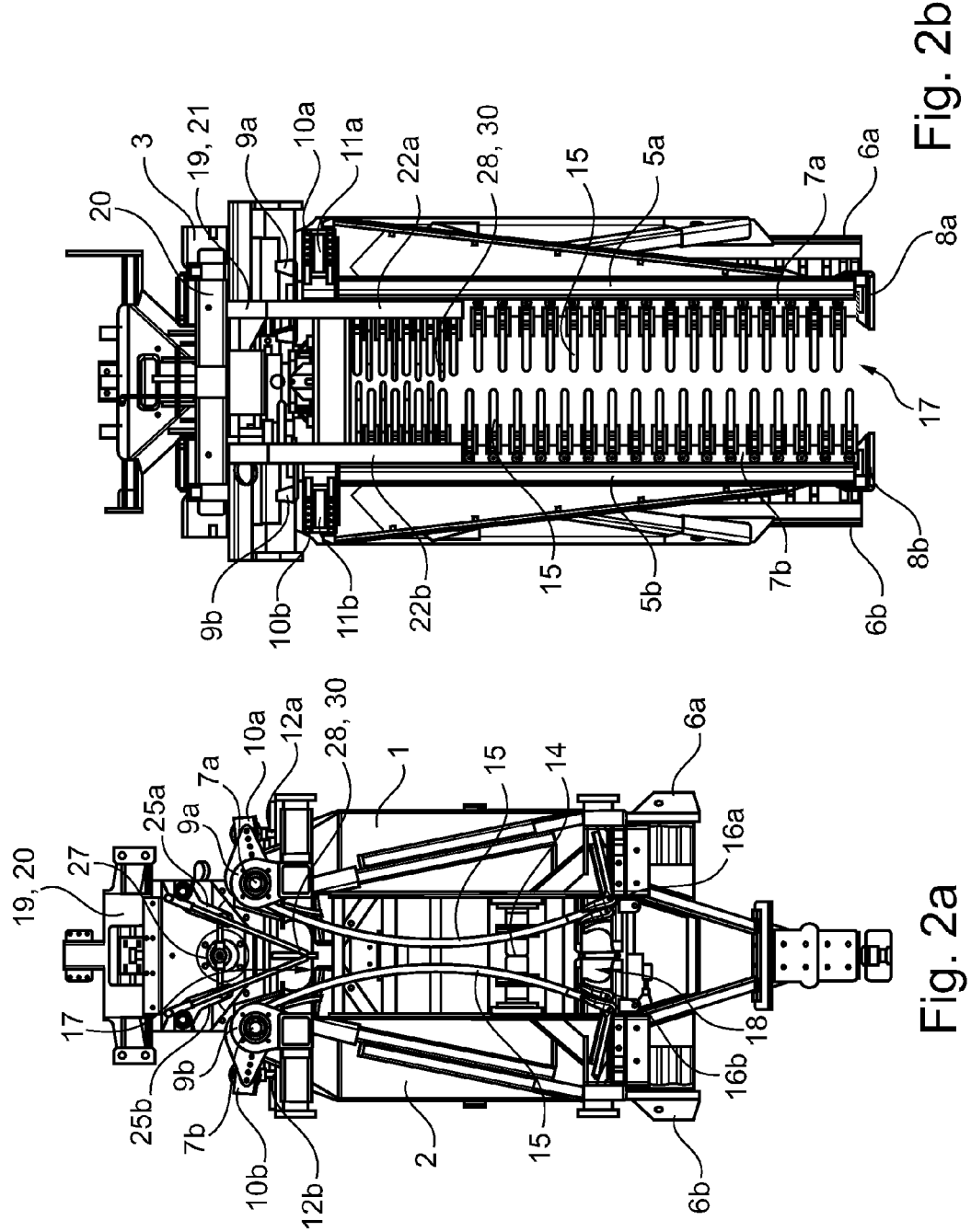
FIG. 2 shows diagrammatically the harvesting machine of FIG. 1 respectively from below (FIG. 2a) and from the front (FIG. 2b)
Figure 3:
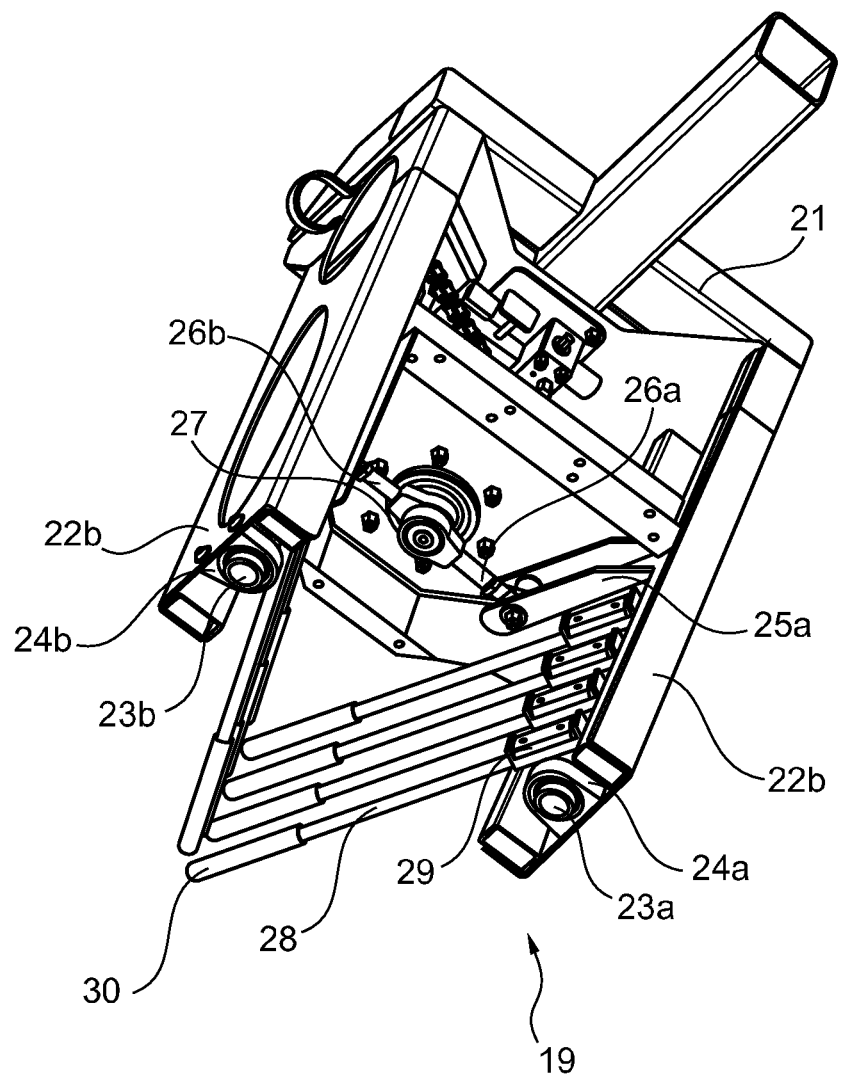
FIG. 3 shows diagrammatically and in perspective from below the additional shaker system of the harvesting unit from FIGS. 1 and 2.

In FIGS. 1 and 2, the straddling chassis includes a weld assembly comprising a left-hand longitudinal member 1, a right-hand longitudinal member 2, a front cross member 3, a rear cross member 4, left-hand and right-hand front vertical pillars 5a, 5b, respectively, and left and right rear vertical pillars 6a and 6b, respectively.

The harvesting unit includes a main shaker system including two shaker devices arranged on respective sides of the harvesting tunnel to transversely delimit a central part of said tunnel. In particular, the main shaker system may be constituted in accordance with document FR 2 605 487.

In the figures, the left-hand shaker device of the main system includes a left-hand vertical shaft 7a that is rotatably mounted by means of two bearings 8a, 9a that are mounted on the front cross member 3 and at the lower end of the left-hand front vertical pillar 5a, respectively.

Similarly, the right-hand shaker device of the main system includes a right-hand vertical shaft 7b that is rotatably mounted by means of two bearings 8b, 9b that are mounted on the front cross member 3 and at the lower end of the right-hand front vertical pillar 5b, respectively.

Moreover, the main shaker system further includes a mechanism for driving the left-hand and right-hand shaker devices. The drive mechanism includes left-hand and right-hand radial arms 10a and 10b, respectively, fixed to the upper end of the left-hand and right-hand vertical shafts 7a and 7b, respectively. Alternatively, the radial arms 10a, 10b may be fixed to the lower end of vertical shafts 7a, 7b, respectively.

Each of the radial arms 10a, 10b is articulated about a left-hand vertical shaft 11a and a right-hand vertical shaft 11b, respectively, to one of the ends of a left-hand link 12a and a right-hand link 12b, the other end of which is articulated to a crank pin of a left-hand eccentric (not shown) and a right-hand eccentric 13, respectively, each of said eccentrics being fixed to an end of a respective transverse rod 14 rotatably mounted by means of two bearings (not shown) carried by respective longitudinal members 1, 2 of the straddling chassis. The length of the links 12a, 12b is advantageously adjustable.

The drive mechanism may further include a pulley or sprocket that is affixed to the transverse rod 14 and connected by a transmission belt or an endless chain to a second pulley or sprocket that is driven in rotation by a motor, for example a hydraulic motor. Thus when the motor turns, the drive mechanism activates each shaker device of the main shaker system by causing each vertical arm 7a, 7b to oscillate about its axis.

Furthermore, each shaker device of the main shaker system includes shaker members 15 that extend longitudinally and are spaced vertically from each other, the members 15 of each of said devices being spaced transversely to delimit between them the central part of the harvesting tunnel.

Referring to FIGS. 1 and 2, the members 15 of the main shaker system are held curved between two front vertical shafts 7a, 7b and two rear vertical shafts 16a, 16b that are rotatably mounted relative to respective rear vertical pillars 6a, 6b of the straddling chassis. Moreover, the front end of each shaker member 15 is fixed, for example bolted, to a vertical shaft 7a, 7b in order for said member to be driven in oscillation by said shaft.

In the figures, each shaker member 15 comprises a rod which, as in the document FR 2 605 487 in particular, may have a small section compared to its length and may be manufactured in a flexible material, for example one based on a polyester resin reinforced with glass fibres or based on a polyamide. The rod may be hollow or solid or may have a structure with a core having the desired flexibility characteristics coated with a layer formed of a wear material different from that of the material in which said core is produced.

To optimise the shaking height of the harvesting unit, the main shaker system may include members 15 that extend vertically over substantially the entire height of the shaking tunnel. In particular, in the figures, each shaker device of the main shaker system comprises twenty-one shaker members 15, the shaker members 15 of the left-hand shaker device being offset vertically relative to the shaker members 15 of the right-hand shaker device.

Moreover, the members 15 of the main shaker system are held curved between the front vertical shafts 7a, 7b and the rear vertical shafts 16a, 16b, respectively, to form between them a convergent entry 17 and a divergent exit 18 for the central part of the shaker tunnel.

The harvesting unit further includes an additional shaker system 19 that is mounted on the straddling chassis, said additional shaker system including two shaker devices disposed on respective sides of the harvesting tunnel to delimit transversely a front upper part of said tunnel.

In FIGS. 1 and 2, the straddling chassis includes a front upper crossmember 20 on which the additional shaker system 19 is mounted. Thus when the chassis is straddling a plant the height of which is greater than the height of the crossmember 20, said plant is bent, with the result that the top of said plant moves along the front upper part of the shaker tunnel.

Referring to the figures, the additional shaker system 19 includes an additional chassis constituted by a welded structure comprising a cross member 21 and left-hand and right-hand vertical pillars 22a, 22b, respectively, a respective vertical shaft 23a, 23b being rotatably mounted on a vertical pillar 22a, 22b by means of a bearing 24a, 24b. Furthermore, the upper end of each vertical shaft 23a, 23b is rigidly fixed to left-hand and right-hand radial drive arms 25a and 25b, respectively, vertically articulated to one of the ends of a link 26a, 26b, the other ends of said links being articulated to a crank pin of an eccentric 27, said eccentric being driven in rotation by a motor (not shown). Thus, when the motor rotates, each vertical shaft 23a, 23b of the additional shaker system 19 oscillates about its axis.

Moreover, each shaker device of the additional shaker system 19 includes shaker members 28 that extend longitudinally and are vertically spaced from each other, the members 28 of each of said devices being spaced transversely to delimit between them the front upper part of the shaker tunnel.

Furthermore, the shaker members 28 of the additional shaker system 19 extend vertically only in a front upper part of the shaker tunnel. In particular, in the figures, each shaker device of the additional shaker system 19 includes four shaker members 28, the shaker members 28 of the left-hand shaker device being offset vertically relative to the shaker members 28 of the right-hand shaker device.

Moreover, the shaker members 28 may each be formed of a rod having a small cross-section compared to its length and that may be produced in a flexible material, for example one based on a polyester resin reinforced with glass fibres or based on a polyamide. The rod may be hollow or solid or have a structure with a core having the desired flexibility characteristics and coated with a layer formed in a wear material different from the material in which said core is produced.

In the figures, the members 28 each have a front end 29 mounted to a respective vertical pillar 22a, 22b, in particular by being fixed, for example screwed, to a vertical shaft 23a, 23b, in order for said member to be driven in oscillation by said vertical shaft. Moreover, each member 28 has a free rear end 30 that extends in the vicinity of the front end of the members 15 to be arranged in the upper entry of the central part of the shaker tunnel. Accordingly, the front upper part of the shaker tunnel leads in a convergent manner into the central part of said tunnel, which facilitates guiding the plant to be shaken into said tunnel.

Moreover, to facilitate introduction of the plant into the harvesting tunnel and bending of said plant before it is shaken by the additional shaker unit 19, the straddling chassis may be equipped with a front duct that extends said harvesting tunnel toward the front. In particular, the front duct may have an upper slope converging progressively toward the front upper part of the harvesting tunnel in order to enable the plant to be bent progressively and not to be damaged during said bending.

Moreover, to facilitate guiding of the plant at the exit from the harvesting tunnel, the straddling chassis may be equipped with a rear duct that extends said harvesting tunnel toward the rear. In particular, the rear duct may have an upper slope diverging progressively from the rear upper part of the central part of the harvesting tunnel in order to enable the plant to be straightened up progressively and not to be damaged during said straightening.

In order to optimise the shaking of the plants, the harvesting unit includes a device for driving the main shaker system and the additional shaker system 19 that is adapted to induce combined oscillation of the shaker devices of each of said systems.

In particular, the driving device of each of the shaker systems is such that the corresponding vertical shafts 7a, 7b—respectively the corresponding vertical shafts 23a, 23b—oscillate in the same direction, in order to generate in the central part—respectively in the front upper part—of the harvesting tunnel a wave of shaking of the members 15—respectively the members 28. Thus the plant introduced into the harvesting tunnel is shaken and not struck by the members 15, 28, which enables the fruit present on said plant to be harvested without damaging said plant.

In the embodiment shown, the additional shaker system 19 is mounted on the straddling chassis so that the top and trunk of a plant introduced into the harvesting tunnel are shaken at the same time, respectively in the front upper part and in the central part of said tunnel, which makes it possible to optimise the harvesting of the fruit present on said plant.

Moreover, the top and the trunk of a plant have different resistances to oscillation and different masses to be moved. Thus, to optimise the harvesting of the fruit on a plant, the drive device may include means for inducing differentiated oscillation of each of the shaker systems, said means further enabling out of phase oscillation of the shaker systems, for example by imparting different oscillation speeds to the vertical shafts 7a, 7b and 23a, 23b.

The invention claimed is:

1. Fruit harvesting unit comprising
a straddling chassis delimiting a harvesting tunnel into which plants to be shaken are introduced successively to move through said tunnel between a front opening and a rear opening of said tunnel,
said harvesting unit having a main shaker system including two shaker devices disposed on respective sides of the harvesting tunnel, transversely delimiting a central part of said tunnel,
an additional shaker system mounted on the straddling chassis, said additional shaker system including two shaker devices disposed on respective sides of the harvesting tunnel, delimiting transversely a front upper part of said tunnel; and
wherein each shaker device includes shaker members that extend longitudinally and are spaced vertically from each other, the members of each of the devices spaced transversely, delimiting between them the central and upper parts, respectively, of the harvesting tunnel.

2. Fruit harvesting unit according to claim 1, wherein the main shaker system includes members that extend vertically over substantially all of a height of the shaker tunnel, the members of the additional shaker system extending vertically over only a front upper part of said tunnel.

3. Fruit harvesting unit according to claim 1, wherein the members of the additional shaker system have a front end mounted on a vertical shaft and a free rear end in the vicinity of the front end of the members of the main shaker system to be disposed in the upper entry of the central part of the harvesting tunnel.

4. Fruit harvesting unit according to claim 1, wherein the members of the main shaker system are held curved between two front vertical shafts and two rear vertical shafts, respectively, to form between them a convergent entry and a divergent exit for the central part of the harvesting tunnel.

5. Fruit harvesting unit according to claim 1, wherein it includes a device for driving the shaker systems that is adapted to induce combined oscillation of the shaker devices of each of said systems.

6. Fruit harvesting unit according to claim 5, wherein the driving device is configured for driving differentiated oscillation of each of the shaker systems.

7. Fruit harvesting unit according to claim 5 wherein the driving device is adapted to enable out of phase oscillation of the shaker systems.

8. Fruit harvesting unit according to claim 1, wherein the straddling chassis includes a front upper crossmember on which the additional shaker system is mounted.

* * * * *